United States Patent [19]
Hirose

[11] Patent Number: 5,801,769
[45] Date of Patent: Sep. 1, 1998

[54] VIBRATION COMPENSATOR WITH CORRECTS FOR VIBRATION ERRORS BASED ON SERVO CONTROL UNIT ERRORS

[75] Inventor: Hisataka Hirose, Yokohama, Japan

[73] Assignee: Canon Kabushiki Kaisha, Tokyo, Japan

[21] Appl. No.: 876,592

[22] Filed: Jun. 16, 1997

Related U.S. Application Data

[60] Continuation of Ser. No. 462,797, Jun. 5, 1995, abandoned, which is a division of Ser. No. 172,379, Dec. 22, 1993, Pat. No. 5,493,333.

[30] Foreign Application Priority Data

Dec. 28, 1992 [JP] Japan .................. 4-361628

[51] Int. Cl.$^6$ .................. H04N 5/225
[52] U.S. Cl. .................. 348/208; 348/495; 386/90; 386/20
[58] Field of Search .................. 348/208, 233, 348/345, 358, 497; 350/13–20, 85–91; 386/91, 88, 12, 13, 85, 17, 20, 15, 113, 89, 90; H04N 5/225

[56] References Cited

U.S. PATENT DOCUMENTS

| | | |
|---|---|---|
| 4,403,256 | 9/1983 | Green et al. .................. 348/208 |
| 4,404,592 | 9/1983 | Pepin et al. .................. 348/208 |
| 4,864,409 | 9/1989 | Platie et al. .................. 348/208 |
| 5,012,270 | 4/1991 | Sekine et al. .................. 354/430 |
| 5,045,950 | 9/1991 | Iwamura et al. .................. 348/208 |
| 5,053,876 | 10/1991 | Blissett et al. .................. 348/208 |
| 5,107,293 | 4/1992 | Sekine et al. .................. 354/430 |
| 5,235,427 | 8/1993 | Kim .................. 348/208 |
| 5,291,300 | 3/1994 | Ueda .................. 348/208 |
| 5,294,991 | 3/1994 | Oshima et al. .................. 348/208 |
| 5,371,539 | 12/1994 | Okino et al. .................. 348/208 |

*Primary Examiner*—Nathan J. Flynn
*Attorney, Agent, or Firm*—Fitzpatrick, Cella, Harper & Scinto

[57] ABSTRACT

An apparatus including an image sensing system which receives light from an object and further outputs a video signal; a reproducing system which reproduces a video signal recorded on a recording medium; a selection circuit which selectively outputs either the video signal provided by the image sensing system or the video signal provided by the reproducing system; and a vibration compensation circuit which compensates picture vibrations of the video signal selected by the selection circuit. With this arrangement, it is possible to effectively avoid picture vibrations associated with video signals provided by the reproducing system and by the image sensing system, and thus it is possible to obtain excellent quality of pictures.

10 Claims, 11 Drawing Sheets

VIBRATION COMPENSATOR WITH CORRECTS FOR VIBRATION ERRORS BASED ON SERVO CONTROL UNIT ERRORS

This application is a continuation of application Ser. No. 08/462,797, filed Jun. 5, 1995, now abandoned, which is a divisional of application Ser. No. 08/172,379, filed Dec. 22, 1993, now U.S. Pat. No. 5,493,333, issued Feb. 20, 1996.

BACKGROUND OF THE INVENTION

1. Field of the Invention

The present invention relates to a recording and/or reproducing apparatus, more particularly, to an imaging apparatus or a video camera system having a function of avoiding fluctuations or vibrations of pictures contained in video signals.

2. Description of the Related Art

In recent years, with video cameras integrated with a VTR coming into extensive use, their size and weight have been reduced and higher magnifications have been achieved. However, when such a video camera is used by being held by an operator's hands, vibrations of the camera may occur. Thus, it becomes necessary to compensate such vibrations. For this purpose, there have been proposed some techniques such as an inertial pendulum mechanism for preventing vibrations with a compensation optical system supported movably by a gimbals mechanism in which vibrations of pictures due to vibrations of operator's hands are compensated by the inertia of the compensation optical system; a vibration preventing system with a varying angle prism disposed in front of a front video lens wherein the apical angle of the prism is controlled in response to the output of a sensor which detects vibrations; and an electronic system for preventing vibrations wherein a video signal output from an image sensing device is stored in an image memory and picture vibrations are compensated by shifting the read-out addresses of the image memory depending on the amount of movement of the picture detected based on the information associated with the video signal stored in the image memory.

Of these techniques, the electronic system for preventing vibrations has in particular received much attention in recent years because of its advantages in that it does not need any special mechanical parts for compensating picture vibrations, and in that it is possible to reduce the size, weight, and cost due to the fact that the rapid progress of semiconductor technology permits a very large scale electronic circuit to be contained in a very small package.

FIG. 1 is a block diagram showing a configuration of a VTR incorporated with a video camera in a single device, which has a conventional electronic vibration compensation system.

In this figure, a signal is provided by a camera image sensing device 100 to a video camera signal processor 110, which performs AGC processing, gamma correction, matrix processing, and other required processing on the signal provided by the image sensing device 100. The resulting signal is output as a television image signal. This television image signal is applied to a picture vibration compensation circuit 120, which eliminates a picture vibration component included in the video signal. Then, after processing by a recording signal processor 130, the video signal is recorded on a recording tape via a recording head 140.

However, in the above-mentioned conventional VTR incorporated with a video camera in a single device having a hand-vibration compensation system, picture vibration compensation is performed on the video signal provided by the camera signal processor 110, and then the video signal is recorded with the VTR. In such an arrangement, if accurate detection is not made whether picture movement is due to hand-vibrations or due to the operator's intentional movement such as panning and tilting, then the picture vibration compensation causes the video signal to become unnatural. In an electronic picture compensation system of this type in which picture vibration is compensated based on an input video signal, interpolation is usually performed by means of electronic zooming so as to recover the reduction in the angle of view. Due to the principle of this system, degradation of resolution of the video signal occurs. Therefore, if the picture vibration compensation processing is always in operation, then the resolution of the recorded video signal is degraded even in the case where hand-vibrations do not occur.

Furthermore, the area associated with vibration compensation is automatically determined by an imaging sensing device, memory, picture quality, and the like. Therefore, if the compensation amount for vibrations exceeds the limitations, further compensation is impossible and thus the picture becomes ugly.

Furthermore, because the magnitude of motions such as hand vibrations is detected from the video signal output from the image sensing device, it is essentially difficult to make an accurate decision whether the vibrations in the video signal are due to vibrations of the hands or due to movement of an object itself. To solve this problem, some known techniques include additional electrical or mechanical vibration vector detection means such as angular velocity detection means for detecting a vibration vector. In this technique, the vibration detection means is directly attached to the body of a camera itself, and thus it is possible to decide whether the camera itself is vibrating or whether an object is vibrating. However, such an arrangement causes an increase in the complexity of the circuits and an increase in cost.

SUMMARY OF THE INVENTION

It is an object of the present invention to solve the problems described above.

More specifically, it is an object of the present invention to provide an imaging apparatus which is capable of preventing picture vibration associated with both reproduced video signals and video signals provided by an image sensing device and which is capable of providing excellent quality of pictures.

To achieve the objects described above, in one aspect of the present invention, an imaging apparatus is provided, comprising image sensing means for receiving light from an object, and for providing a video output signal; reproducing means for reproducing a video signal recorded on a recording medium; selection means for selectively outputting either a video signal provided by the image sensing means or a video signal provided by the reproducing means; and vibration compensation means for compensating picture vibrations of a video signal selected by the selection means.

According to another aspect of the present invention, an imaging apparatus is provided comprising image sensing means for converting light from an object into a video signal, and for outputting the video signal. Vibration compensation means are provided for compensating picture vibrations of the video signal provided by said image sensing means. Driving means are also provided for driving a head relative to a recording medium. Servocontrol means are provided for controlling a driving condition associated with said driving means, and control means are also provided for controlling said vibration compensation means, based on an error signal of said servocontrol means.

According to a further aspect of the present invention, an imaging apparatus is provided comprising image sensing means for converting light from an object into a video signal, and for outputting the video signal. Vibration compensation means are provided for compensating picture vibrations of the video signal provided by said image sensing means. In addition, there are provided driving means for driving a head relative to a recording medium, said driving means including motor means for moving the head. Moreover, there are included servocontrol means for controlling a driving condition associated with said driving means. The servocontrol means comprises phase comparison means for comparing the phase of pulses corresponding to a state of the head with the phase of a reference signal having a predetermined frequency so as to output a phase error signal. In addition, there are included control means for controlling said vibration compensation means, based on the phase error signal detected by said phase comparison means.

According to still another aspect of the present invention, an imaging apparatus is provided comprising image sensing means for converting light from an object into a video signal, and for outputting the video signal. Vibration compensation means are provided for compensating picture vibrations of the video signal provided by said image sensing means. The vibration compensation means comprises motion vector detection means for detecting a motion vector associated with the video signal provided by said image sensing means. The vibration compensation means further comprises representative vector production means for producing a representative vector based on the motion vector detected by said motion vector detection means. In addition, there are provided driving means for driving a head relative to a recording medium, and servocontrol means for controlling a driving condition associated with said driving means. Control means are included for controlling said vibration compensation means, based on an error signal provided by said servocontrol means. The control means comprises setting means for setting the motion vector detected by said motion vector detection means to a predetermined value.

According to yet another aspect of the present invention, an imaging apparatus is provided comprising image sensing means for converting light from an object into a video signal, and for outputting the video signal. There are also provided recording and reproducing means for recording and reproducing a video signal on/from a recording medium, said recording and reproducing means comprising a head. Driving means are included for driving said head relative to the recording medium, and servocontrol means are also provided for controlling a driving condition associated with said driving means. In addition, there are included selection means for selectively outputting either the video signal provided by said image sensing means or the video signal provided by said reproducing means. Vibration compensation means are also provided for compensating picture vibrations of the video signal, and control means are included for controlling said vibration compensation means, based on an error signal provided by said servocontrol means. The control means comprises vibration detection means for detecting picture vibration of the video signal, based on the error signal provided by said servocontrol means.

Additional objects and features of the invention will be more readily apparent from the following detailed description of various aspects of the invention in conjunction with the drawings.

DESCRIPTION OF THE PREFERRED EMBODIMENTS

Embodiments of the present invention will now be described below with reference to the accompanying drawings.

Figure 1:
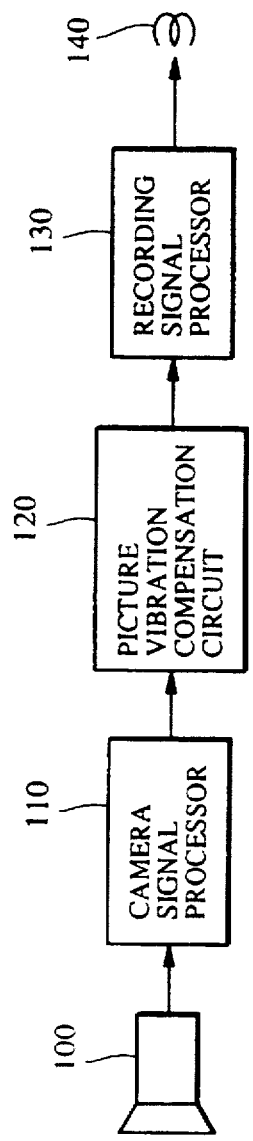
FIG. 1 is a block diagram showing the configuration of the main portions of a VTR incorporated with a video camera in a single device having a conventional type of vibration preventing system.
Figure 2:
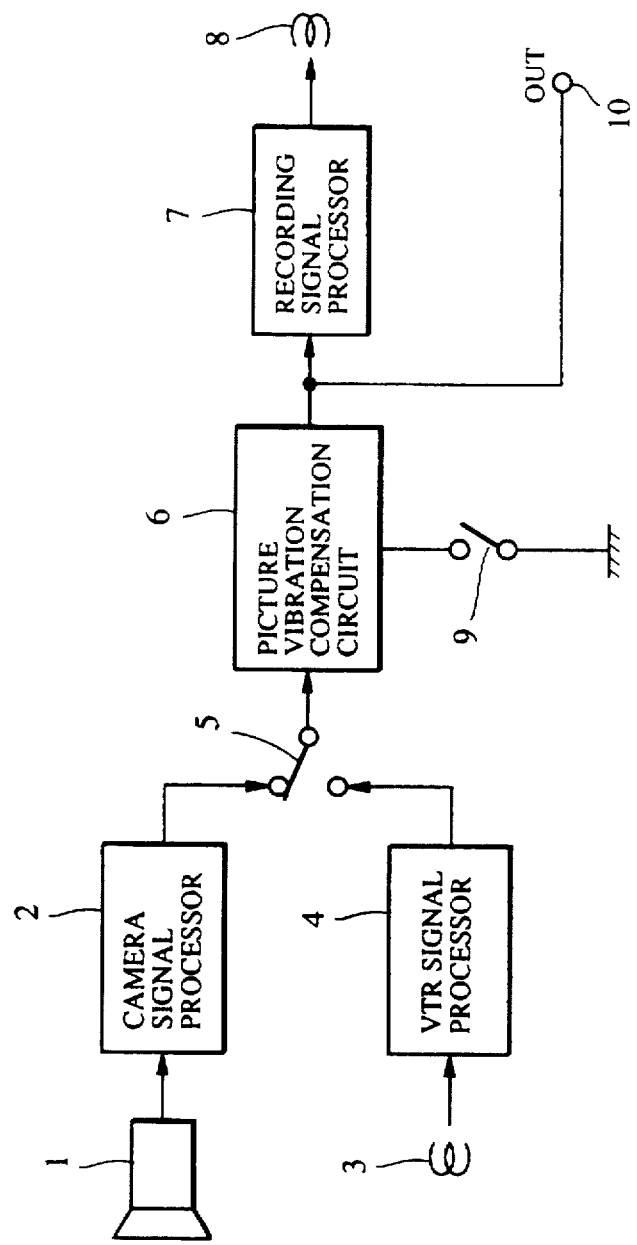
FIG. 2 is a block diagram showing the configuration of a VTR incorporated with a video camera in a single device in accordance with a first embodiment of the present invention.

FIG. 2 is a block diagram showing the configuration of a VTR incorporated with a video camera in a single device in accordance with a first embodiment of the present invention.

As seen in FIG. 2, light associated with an object passing through a lens (not shown) is converted to an electrical signal by an image sensing device 1 such as a CCD, and the obtained electrical signal is provided to a camera signal processor 2, where a video signal is produced based on this signal from the image sensing device 1.

Reference numeral 3 denotes a reproduction head for reading out signals recorded on a tape in playback operation. The reproduction signal from the reproduction head 3 is provided to a VTR signal processor 4, where a video signal is produced based on this reproduction signal. The video signals from the camera signal processor 2 and from the VTR signal processor 4 are each provided to a switch 5 which selects either of these signals to provide it to a picture vibration compensation circuit 6.

The video signal is compensated for picture vibrations as will be described later by the picture vibration compensation circuit 6, and then it is converted by a recording signal processor 7 into a signal in a form suitable for recording and displaying. This converted signal is recorded via a head 8 on a tape and is also output to external devices through an output terminal 10. A switch 9 is provided for on/off control of the picture vibration compensation circuit 6. An operator may set the switch 5 so that output signals from the camera signal processor 2 are selected when he or she desires to record video signals from the image sensing device 1; while when he or she desires to watch pictures associated with reproduction signals from the reproduction head 3 displayed on external display means, he or she may set the switch 5 so that output signals from the VTR signal processor 4 are selected.

Now, the control of the picture vibration compensation circuit 6 by means of the switch 9 will be described below.

As described above, when an operator desires to record video signals obtained from the image sensing device 1, the switch 5 is set so that the output of the camera signal processor 2 is selected. In this situation, when a picture is taken by a video camera, the hand vibration component included in the video signal is compensated by the picture vibration. compensation circuit 6 and thus a picture with no vibrations can be recorded on a tape. On the other hand, when he or she desires to watch pictures associated with reproduction signals from the reproduction head 3 displayed on external display means (not shown), the switch 5 is set so that the output of the VTR signal processor 4 is selected. When this reproduction signal is selected, the operator may either switch on or switch off the switch 9 to perform desired control on the picture vibration compensation circuit 6. If he or she judges that effective compensation for picture vibration can be obtained, then the switch 9 is switched on so as to compensate picture vibrations included in the reproduction signal and so as to reproduce a picture with no vibrations.

Figure 3:
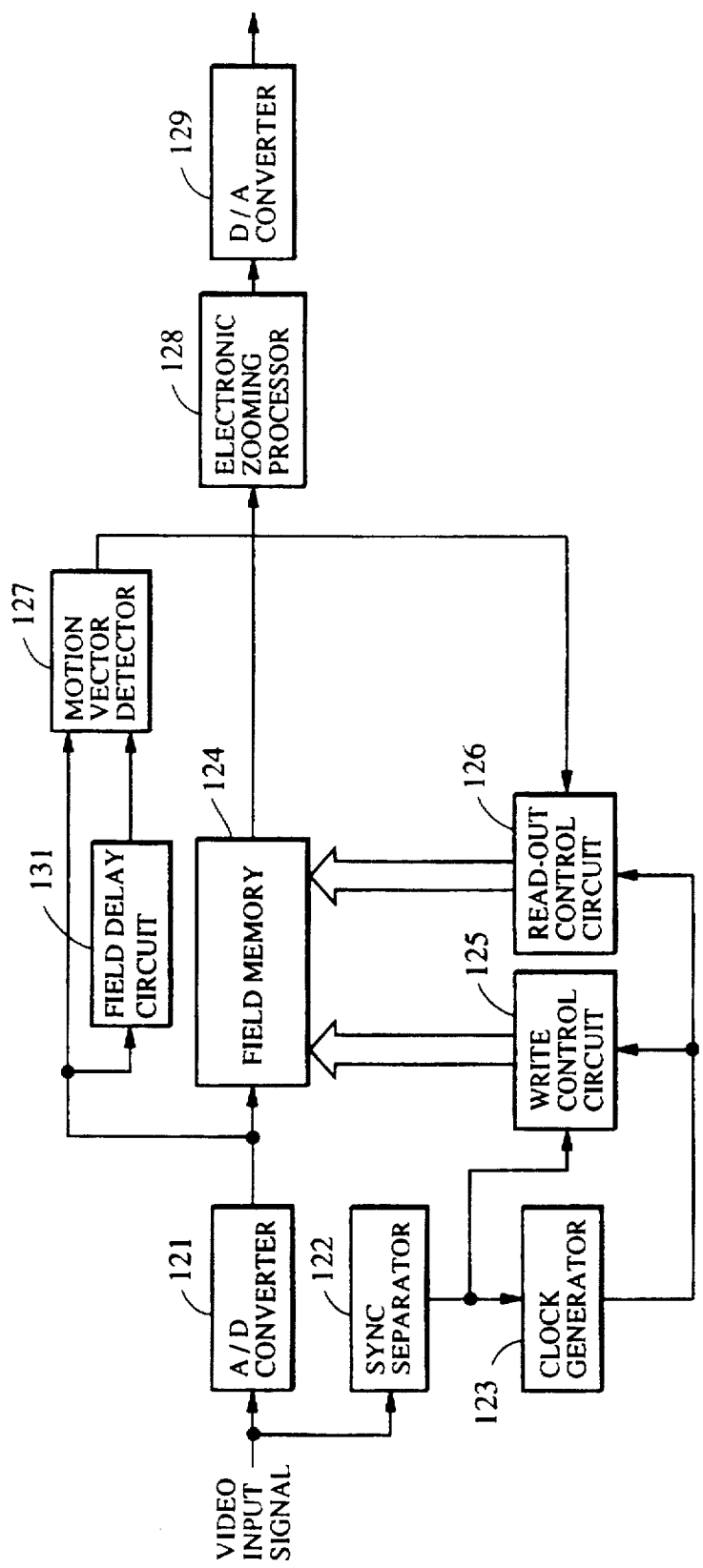
FIG. 3 is a block diagram showing the configuration of a picture vibration compensation circuit of the apparatus shown in FIG. 2.

Referring to FIG. 3, the picture vibration compensation circuit 6 of the present embodiment will be described below in more detail.

FIG. 3 is a block diagram showing a configuration of the picture vibration compensation circuit 6 shown in FIG. 2.

In FIG. 3, a sync separator 122 separates a sync signal from an input video signal, and a clock generator 123 generates a clock signal based on this sync signal. Based on the sync signal and the clock signal, a write control circuit 125 produces an address signal used to write an input signal in a field memory 124. An A/D converter 121 converts the input signal into digital signals which are successively recorded in the field memory 124 designated by the writing address signals described above. The digital video signal from the A/D converter 121 is also input to field delay circuit 131. The field delay circuit 131 then gives one field delay to the input digital signal and outputs said digital signal to motion vector detector 127.

The operation of reading out is carried out as follows: a motion vector between the input video signal and a one-field preceding video signal delayed by the field delay circuit 131 is detected based on these video signals by a motion vector detector 127. Read-out addresses associated with the field memory 124 are controlled by the read-out control circuit 126 so that the motion vector is minimized. In this way, picture vibrations can be compensated by means of control such that the motion vector may be minimized. Because the angle of view associated with the video signal read out from the field memory 124 is slightly reduced after the picture vibrations have been compensated, an electronic zooming processor 128 performs interpolation on each pixel associated with the video signal so that the angle of view may come to have a original value. Then, the video signal is output after it is converted into an analog signal by a D/A converter 129.

In this embodiment, the clock signal applied to the read-out control circuit 126 of the picture vibration compensation circuit 6 may be a reference clock signal with no jitters generated by a crystal-controlled oscillator or the like so that the picture vibration compensation circuit 6 may also be used as a TBC (time base corrector) so as to eliminate jitters included in reproduction video signals, in addition to its operation for picture vibration compensation in reproduction processing of the VTR.

Figure 4:
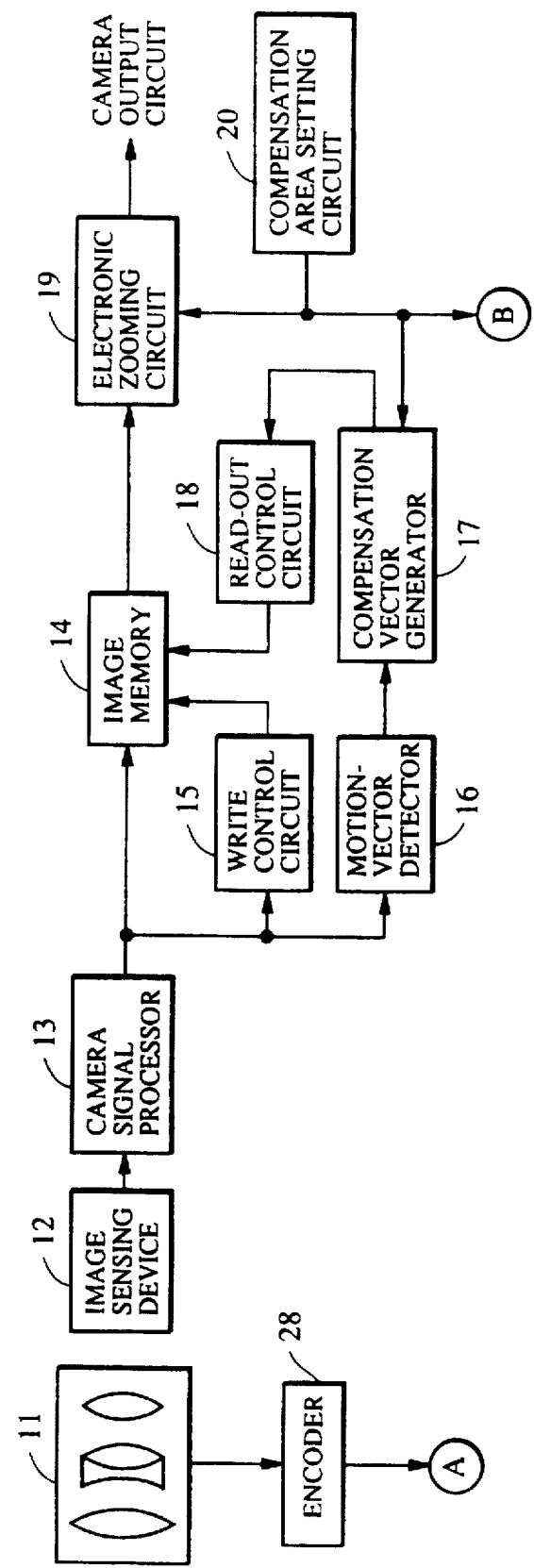
FIG. 4 is a block diagram showing the configuration of a VTR incorporated with a video camera in a single device in accordance with a second embodiment of the present invention.
Figure 5:
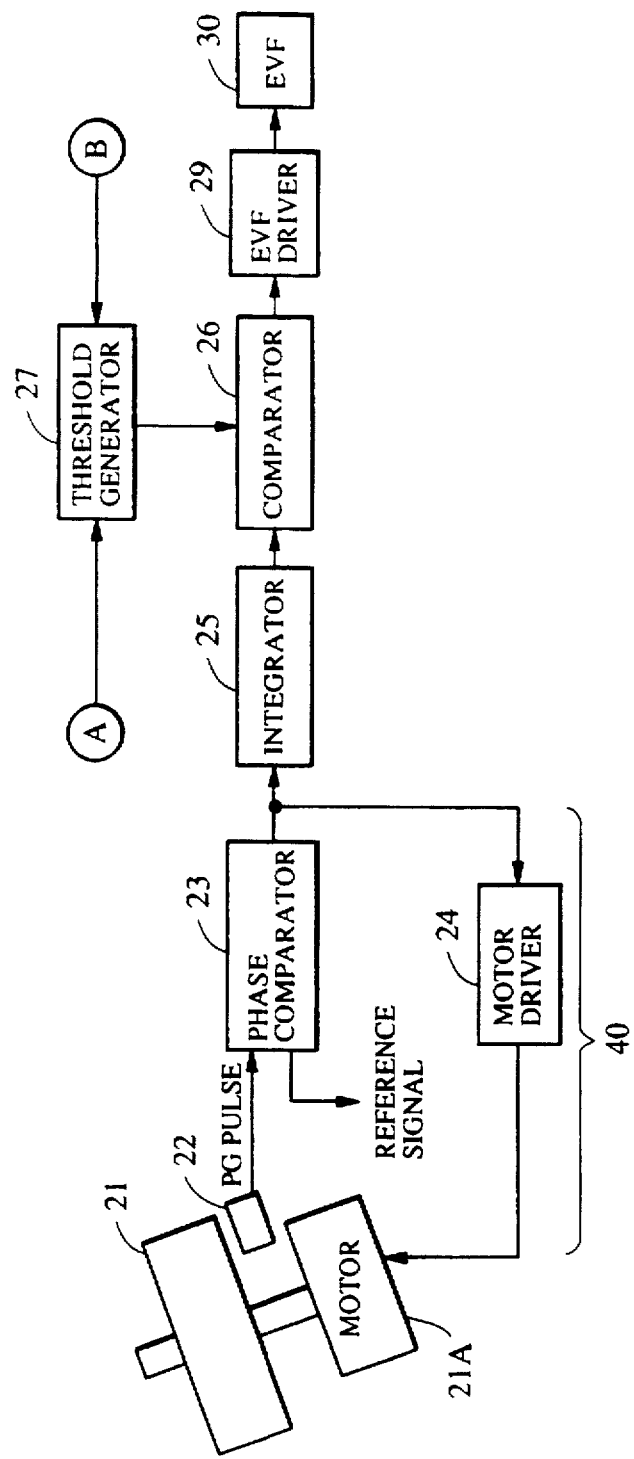
FIG. 5 is a block diagram of a VTR incorporated with a video camera in a single device in accordance with the second embodiment of the present invention, showing the configuration of portions other than those shown in FIG. 4.

Referring to FIGS. 4 and 5, a second embodiment of the present invention will be described below.

FIG. 4 and 5 are a block diagram schematically showing a configuration of a VTR incorporated with a video camera in a single device in accordance with the second embodiment of the invention.

In FIG. 4, there is shown an optical lens system 11 for focusing incident light on to an image sensing device 12 comprising a 2-dimensional CCD which converts the light applied from the optical lens system 11 into electrical signals. There is also provided a camera signal processor 13 which produces video signals from the electrical signals provided by the image sensing device 12. The output of the camera signal processor 13 is coupled to an image memory 14 capable of recording one field of video signal; a write control circuit 15 which controls writing operation of the image memory 14; and a motion vector detector 16 which detects a motion vector by comparing two video signals which are adjacent to each other in time sequence. There is also provided a compensation vector generator 17 which produces a compensation vector by an operation using the motion vectors associated with the previous several fields of video signals which were detected by the motion vector detector 16. The output of the compensation vector generator 17 is connected to a read-out control circuit 18 which controls the read-out location of the image memory 14.

An electronic zooming circuit 19 which electrically enlarges video signals is connected to the output of the image memory 14. The electronic zooming circuit 19 is supplied with output signals from an compensation area setting circuit 20 which provides signals used to set the areas in which picture vibrations are to be compensated. The output of the compensation area setting circuit 20 is also supplied to the compensation vector generator 17 and to a threshold generator 27 which will be described later.

In FIG. 5, there is shown a rotating cylinder 21 of a VTR section. There is also provided a PG pulse generator 22 which generates PG pulses synchronized with the speed of rotation of the rotating cylinder 21. The output of the PG pulse generator 22 is connected to a phase comparator 23 which outputs a signal representing the rotation error of the rotating cylinder 21 (hereinafter referred to simply as an error signal) by comparing the PG pulses with a reference signal with a predetermined frequency. Furthermore, there is provided a motor driving circuit 24 which controls the speed of rotation of a motor 21A coupled to the rotating cylinder 21, based on the error signal provided by the phase comparator 23. Thus, the rotating cylinder 21, the PG pulse generator 22, the phase comparator 23, and the motor driving circuit 24 form a servo loop 40. The speed of rotation of the rotating cylinder 21 with recording and reproducing heads is maintained at a constant value by the servo loop 40.

There are also provided an integrator 25 which integrates the error signals provided by the phase comparator 23; a comparator 26 which compares the output signal of the integrator 25 with the threshold produced by the threshold generator 27; and an encoder 28 which provides the magnification associated with the optical lens system 11, wherein the threshold value of the threshold generator 27 is produced based on both the encoded signal provided by the encoder 28 and the compensation area setting signal provided by the compensation area setting circuit 20. Furthermore, there is also provided an EVF driving circuit 29 which displays the output of the comparator 26 on an EVF 30.

Now, operation of the system will be described below.

After passing through the optical lens system 11, light from an object is focused onto the image sensing device 12, where the light is converted into electrical signals. The output signal of the image sensing device 12 is provided to the camera signal processor 13 which performs AGC processing, gamma correction, separation of luminance signals and color-difference signals, and other required processing on the signal provided by the image sensing device 12. The resulting signal is output as a television image signal. This television image signal is stored in the image memory 14 comprising a field memory under the control of a control signal provided by the write control circuit 15, and the television image signal is also applied to the motion vector detector 16. The motion vector detector 16 detects a motion vector associated with the video signal of the current field by comparing the video signal of the current field with that of one-field previous.

The motion vector output from the motion vector detector 16 is input into the compensation vector generator 17 which produces a compensation vector that moves the displayed picture in the opposite direction to that of the result of an operation using motion vectors associated with the latest several fields. Based on the output of the compensation vector generator 17, the read-out control circuit 18 eliminates the picture vibrations by modifying the starting address of reading out the video signals stored in the image memory 14.

After the vibration component is eliminated, the video signal is enlarged by a magnification value set in the electronic zooming circuit 19. In this operation, the magnification value is provided by the compensation area setting circuit 20 wherein the magnification value is generally set in proportion to the compensation area. When the compensation area is large, the magnification is set to a large value, and when the compensation area is small, the magnification is set to a small value so that degradation in picture quality may be minimized.

Referring again to FIG. 5, the rotation of the rotating cylinder 21 in the VTR section for recording video signals is controlled in such a manner that comparison is made between the reference signal and the output signal of the PG pulse generator 22 which generates PG pulses synchronized with the speed of rotation of the rotating cylinder 21. An error signal is produced corresponding to the phase difference between these two signals, and the error signal is applied to the motor driving circuit 24, whereby a closed circuit is formed by these circuits. This permits the speed of rotation of the rotating cylinder 21 to be maintained always at a value corresponding to the reference signal.

When the VTR incorporated with a video camera in a single device is fixed onto a tripod or the like, the fluctuation in the rotational speed of the rotating cylinder 21 is rather small because of the large inertial force of the rotating cylinder 21 itself. However, when the body of the VTR is vibrated, the rotating cylinder 21 receives force which disturbs its rotation. The error signal provided by the servo loop 40 is constant as long as the rotating cylinder 21 rotates at a constant speed in a stable situation. When external vibration is added to the stable rotation of the rotating cylinder 21, the error signal will change depending on the applied vibration. The integrator 25 integrates the error signals for a predetermined time period (for one field, for example), and the obtained summation is used to evaluate the vibration.

The output of the encoder 28 representing the zooming magnification of the optical lens system 11 and the output signal of the compensation area setting circuit 20 are applied to the threshold generator 27. The threshold generator 27 modifies the threshold value in response to the magnification and the compensation area. That is, when the optical lens system 11 is in a wide angle mode, the threshold is set to a high value, and when the optical lens system 11 is in a telescope mode, the threshold is set to a low value. Furthermore, when the picture vibration compensation area is set to a large area, the threshold is set to a high value and vice versa.

When the signal obtained by integrating the error signals is larger than the threshold value described above, the comparator 26 concludes that the vibration of the VTR itself is so large that there is a high possibility that a picture may vibrate beyond the picture vibration compensation area, and the comparator 26 indicates a warning sign superimposed on a picture on the EVF 30.

As described above, in the present embodiment, if large vibrations occur which may exceed the picture vibration compensation area, the vibrations are detected and a warning sign is indicated on an EVF or the like so as to give warning to an operator. Thus, it becomes possible to avoid taking a video picture including a large amount of vibrations.

Figure 6:
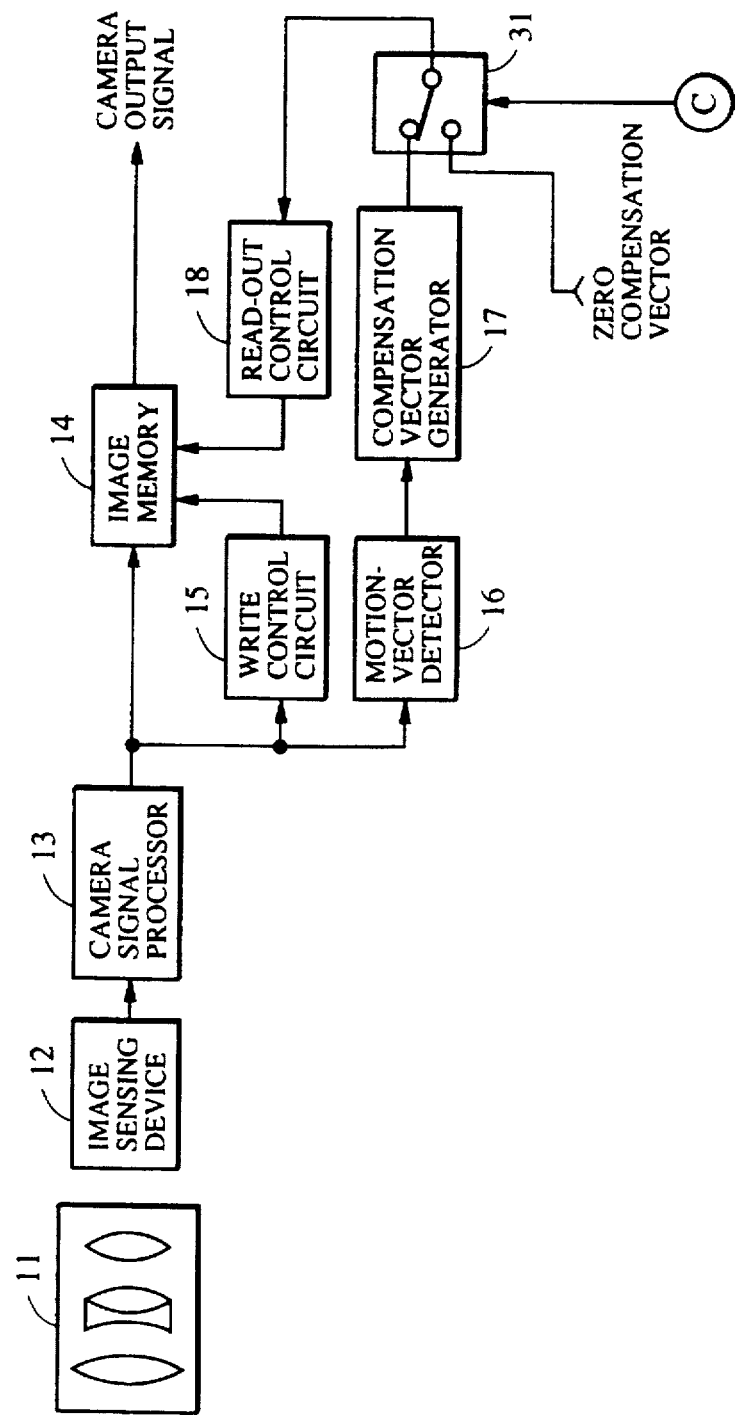
FIG. 6 is a block diagram showing the configuration of a VTR incorporated with a video camera in a single device in accordance with a third embodiment of the present invention.
Figure 7:
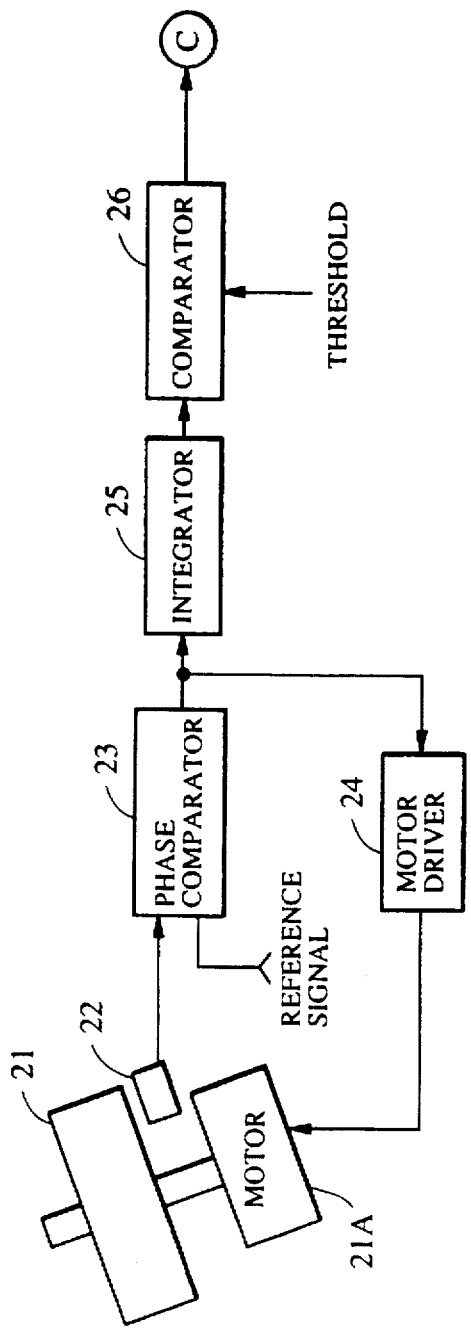
FIG. 7 is a block diagram of a VTR incorporated with a video camera in a single device in accordance with the third embodiment of the present invention, showing the configuration of portions other than those shown in FIG. 6.

Referring to FIGS. 6 and 7, a third embodiment in accordance with the present invention will be described below. In these figures, elements having similar functions to those in the previous figures are denoted by the same corresponding reference numerals as those in the previous figures and detailed descriptions will not be repeated again.

In FIG. 6, a compensation vector produced by a compensation vector generator 17 is applied to a switch 31. The other input terminal of the switch is supplied with a zero compensation vector, i.e., a signal indicating that there is no need for compensation. This switch 31 is switched based on the output of a comparator shown in FIG. 7.

In FIG. 7, as in the case of the previous embodiment, an error signal is provided by an integrator 25 to the comparator 26. The comparator 26 compares the integrated value of the error signals with a predetermined threshold value. If the integrated value of the error signals is larger than the threshold value, then it is concluded that the camera system itself is vibrating. In that case, the comparator 26 outputs a signal indicating that the switch 31 should be switched to select the output of the compensation vector generator 17 so that the operation of picture vibration compensation may be performed. On the other hand, if the integrated value of the error signals is smaller than the threshold value, then it is concluded that the camera system itself is not vibrating, and the comparator 26 outputs a signal indicating that the switch 31 should be switched to select the zero compensation vector. In that case, no operation occurs associated with picture vibration compensation.

As described above, with a system in accordance with present embodiment, it is possible to make an easy decision without using an acceleration detector whether the change of a picture represents the change of the picture itself or whether it is due to the vibrations of the camera system itself, although a conventional electric circuit for picture vibration compensation of the type which detects a motion vector from the video signal does not have such good capability. As a result, it is possible to obtain an excellent quality of pictures without performing undesired and unnecessary picture vibration compensation.

Figure 8:
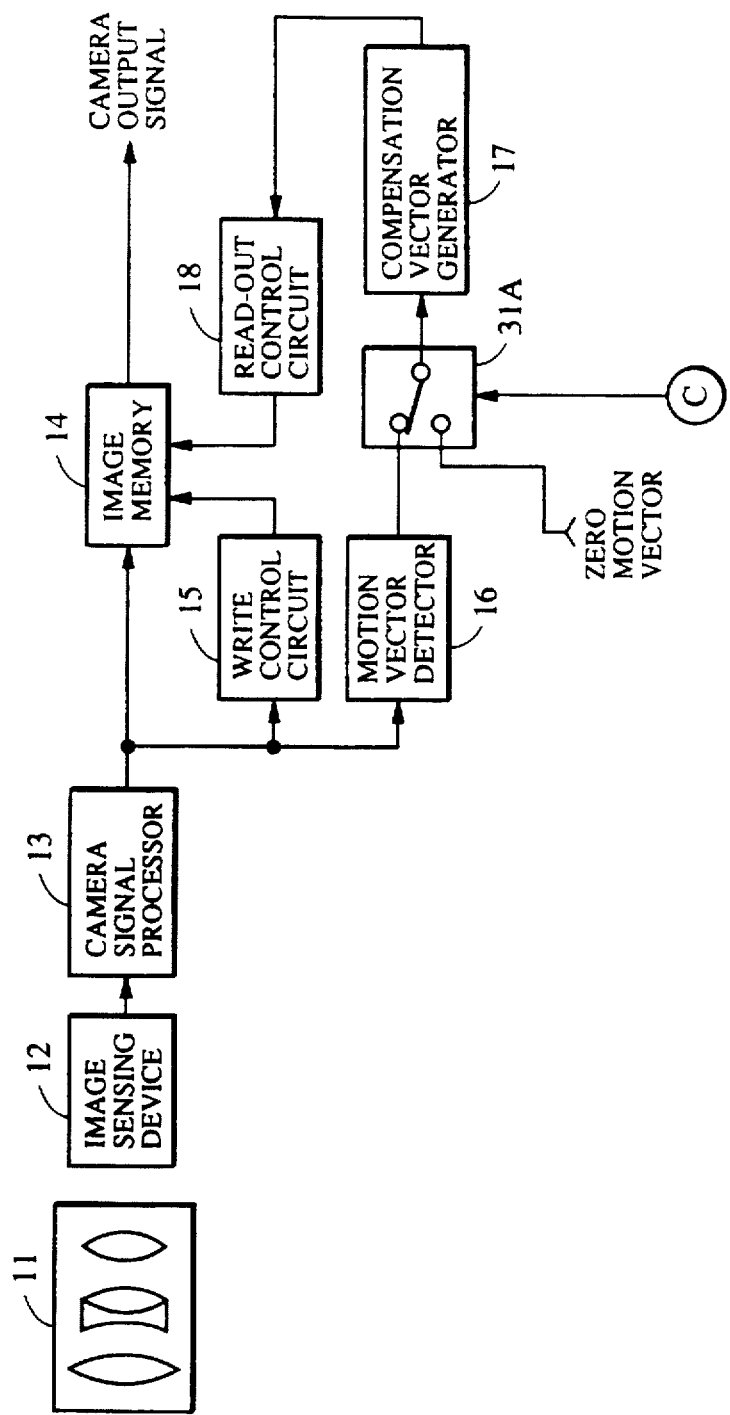
FIG. 8 is a block diagram showing another configuration of a VTR incorporated with a video camera in a single device in accordance with the third embodiment of the present invention.

In the embodiment described above, depending on the output signal of the comparator 26, the output of the compensation vector is switched to obtain optimized control of the picture vibration compensation. However, the method of control is not limited to this. An alternative method may be that instead of the switch 31 shown in FIG. 6, a switch 31A may be provided between the motion vector detector 16 and the compensation vector generator 17 as shown in FIG. 8 so that when it is concluded that the camera system itself is not vibrating, the output of the comparator 26 may cause the switch 31A to be switched to impose the zero motion vector on the output of the motion vector detector 16. In this case, because the compensation vector generator 17 generates a compensation vector based on a value which is the result of an operation using motion vectors from the latest several fields, as described previously, the vibration compensation is not stopped suddenly when the error signal becomes less than the threshold value. Therefore, more natural pictures can be obtained.

Figure 9:
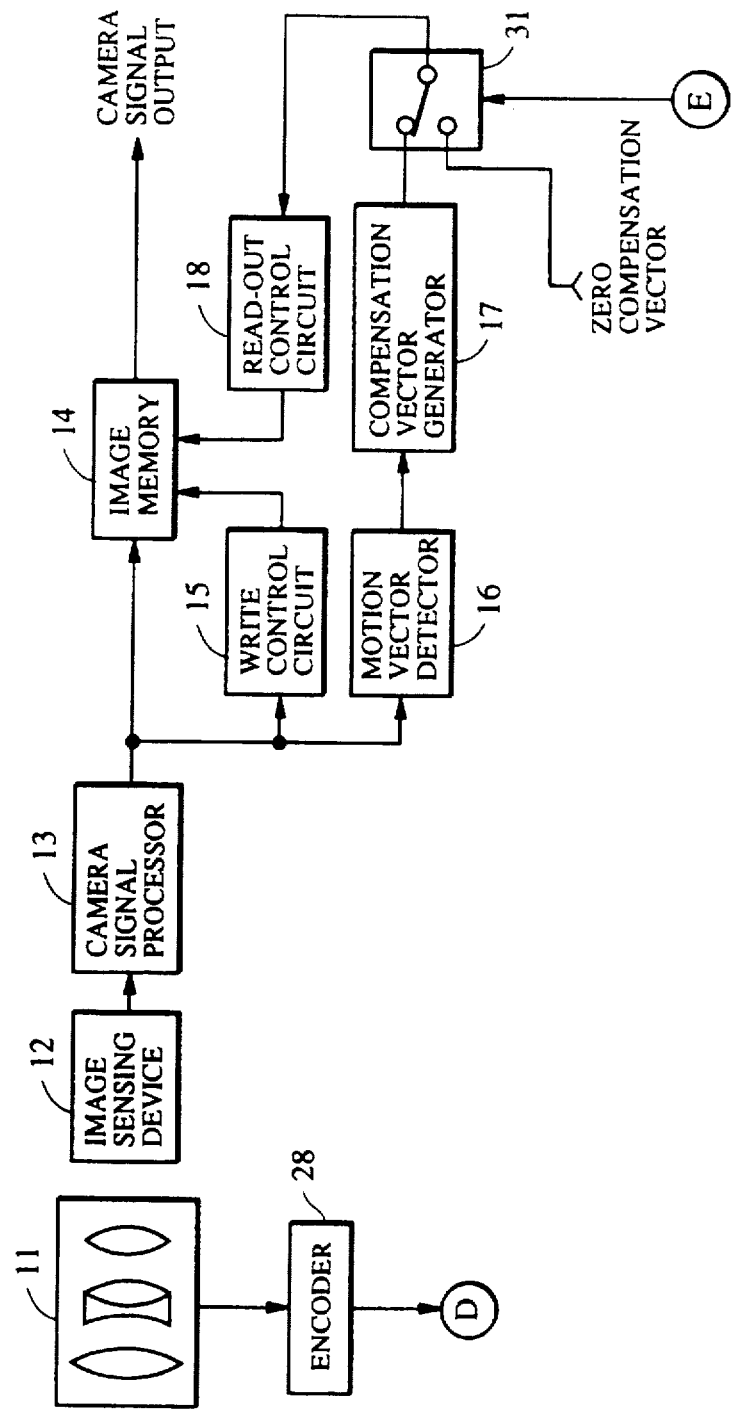
FIG. 9 is a block diagram showing the configuration of a VTR incorporated with a video camera in a single device in accordance with a fourth embodiment of the present invention.
Figure 10:
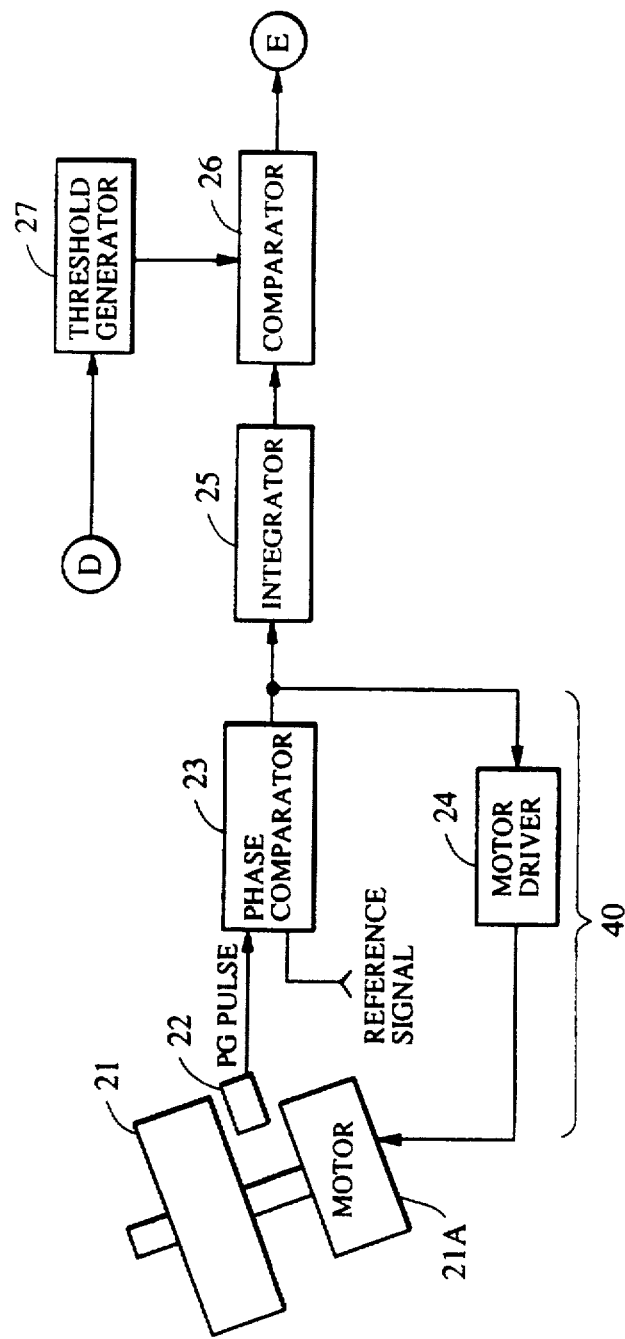
FIG. 10 is a block diagram of a VTR incorporated with a video camera in a single device in accordance with the fourth embodiment of the present invention, showing the configuration of portions other than those shown in FIG. 9.

Referring to FIGS. 9 and 10, a fourth embodiment in accordance with the present invention will be described below. Elements having similar functions to those in the previous figures are again denoted by the same reference numerals as those in the previous figures.

As in the case of the second embodiment described earlier, an encoder 28 outputs a signal indicating a zooming magnification of an optical lens system 11. This signal indicating the magnification is input into a threshold generator 27 shown in FIG. 10. The threshold generator 27 modifies a threshold value in response to the magnification and provides the threshold value to a comparator 26. When the magnification of the optical lens system 11 is in a wide angle mode, it can be understood that vibrations of the camera system do not cause significantly large vibrations of pictures, and thus the threshold is set to a high value. When the magnification of the optical lens system 11 is in a telescope mode, rather slight vibrations result in considerably large vibrations of pictures. Therefore, in this case, the threshold is set to a small value.

As in the case of the previous embodiment, the comparator 26 compares the integrated value of error signals provided by an integrator 25 with the threshold value produced by the threshold generator 27 in such a way described above so as to output a signal indicating the switching of switch 31. In this embodiment, a motion vector associated with a picture is detected from a video signal, and this motion vector is used to control the reading-out location of the image memory which stores video signals so that the picture vibrations may be compensated. Similar control may also be achieved in the case where a varying angle prism is used.

In this embodiment, as described above, the threshold value applied to the comparator 26 is modified depending on the magnification of the optical lens system 11 so as to make a more accurate decision as to whether the compensation for vibrations should be performed.

Figure 11:
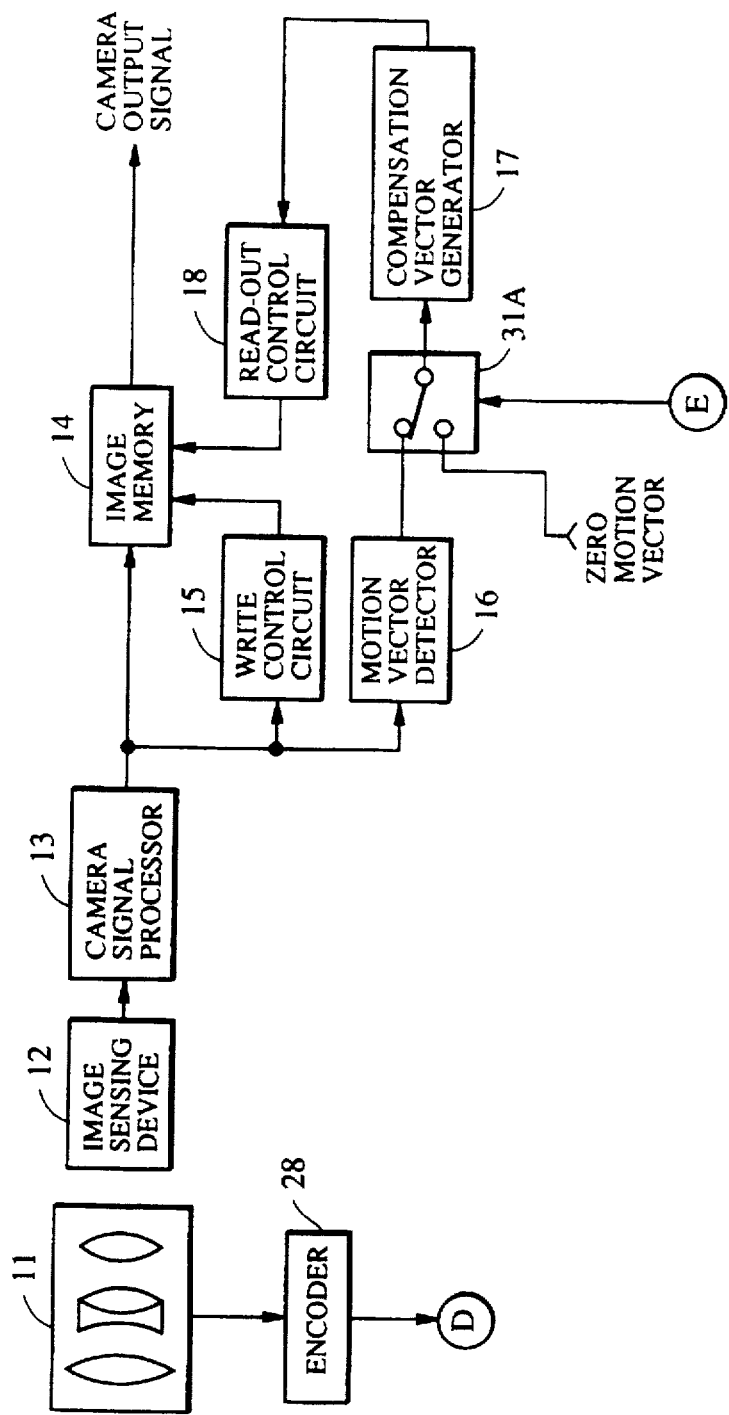
FIG. 11 is a block diagram showing another configuration of a VTR incorporated with a video camera in a single device in accordance with the fourth embodiment of the present invention.

Furthermore, in this embodiment, the control of the compensation operation for picture vibrations is performed based on the output of the comparator 26. However, the method of control is not limited to this. As in the case of the third embodiment, instead of using the switch 31, a switch 31A may be provided between the motion vector detector 16 and the compensation vector generator 17 as shown in FIG. 11 so that based on the output of the comparator 26, the switch 31A may be switched to control the output of the motion vector to achieve optimum control of the picture vibration compensation.

Except as otherwise disclosed herein, the various components shown in outline or in block form in the figures are individually well-known in their internal construction and operation and are not critical either to the making or using of this invention or to a description of the best mode of the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus, comprising:
   (a) image sensing means for receiving light from an object, and for providing video signals;
   (b) reproducing means for reproducing the video signals recorded on a recording medium;
   (c) an image memory for storing the video signals;
   (d) a clock oscillator for outputting clock signals;
   (e) memory control means for controlling writing and reading operations of said image memory;
   (f) vibration compensation means for compensating image vibrations and in the jitter components video signals stored in said image memory by controlling said memory control means, said vibration compensation means controlling said memory control means to write the input video signals in said image memory synchronizing with synchronous signals of the input video signals and clock signals of said clock oscillator, and to read-out the video signals from said image memory synchronizing to the clock signals of said clock oscillator;
   mode switching means for selectively switching modes between an image sensing mode where said image sensing means outputs the video signals, and a reproducing mode where said reproducing means outputs the video signals reproduced from the recording medium, and for supplying the video signals output from said image sensing means to said vibration compensation means in said image sensing mode and supplying the reproduced video signals to said vibration compensation means in said reproducing mode.

2. An apparatus according to claim 1, wherein said vibration compensation means comprises vibration detection means for detecting a picture vibration component from the video signal selected by said mode switching means.

3. An apparatus according to claim 1, further comprising display means for displaying information associated with a selection result given by said mode switching means as well as video images associated with the video signal selected by said mode switching means.

4. An apparatus according to claim 1, further comprising control means for controlling a compensation operation of said vibration compensation means.

5. Apparatus according to claim 1, wherein said vibration compensation means includes an image memory for storing an input image, motion vector detecting means, and a memory controller for controlling a writing or reading address of said image memory on the basis of a motion vector output from said motion vector detecting means.

6. Apparatus according to claim 5, further comprising an electronic zoom circuit for electronically zooming the image signal read out from said image memory.

7. An imaging apparatus, comprising:

(a) image sensing means for converting light from an object into a video signal, and for outputting the video signal;

(b) vibration compensation means for compensating picture vibrations of the video signal provided by said image sensing means, said vibration compensation means comprising motion vector detection means for detecting a motion vector associated with the video signal provided by said image sensing means, said vibration compensation means further comprising representative vector production means for producing a representative vector based on the motion vector detected by said motion vector detection means;

(c) driving means for driving a head relative to a recording medium;

(d) servocontrol means for controlling a driving condition associated with said driving means; and (e) control means for controlling said vibration compensation means, based on an error signal provided by said servocontrol means, said control means comprising setting means for setting the motion vector detected by said motion vector detection means to a predetermined value.

8. Apparatus according to claim 7, wherein said head comprises a helical scanning type rotary head.

9. Apparatus according to claim 7, wherein said recording medium comprises a magnetic tape.

10. Apparatus according to claim 7, further comprising output means for outputting signals provided via said vibration compensation means to an outside of said apparatus.

* * * * *

UNITED STATES PATENT AND TRADEMARK OFFICE
CERTIFICATE OF CORRECTION

PATENT NO. : 5,801,769

DATED : September 1, 1998

INVENTOR(S) : HISATAKA HIROSE

It is certified that error appears in the above-identified patent and that said Letters Patent is hereby corrected as shown below:

COVER PAGE [54] TITLE, and Column 1,
"WITH" should read --WHICH--.

COLUMN 1,
Line 1, "WITH" should read --WHICH--.

COLUMN 5,
Line 33, "vibration." should read --vibration--.

COLUMN 6,
Line 13, "a" should read --an--;
Line 27, "FIG. 4 and 5 are a block diagram" should read
--FIGS. 4 AND 5 are block diagrams--;
Line 32, "on" should read --onto--; and
Line 54, "an" should read --a--.

Signed and Sealed this

Thirteenth Day of July, 1999

Attest:

Q. TODD DICKINSON

*Attesting Officer*  Acting Commissioner of Patents and Trademarks